United States Patent
Lin et al.

(10) Patent No.: US 8,860,251 B2
(45) Date of Patent: Oct. 14, 2014

(54) POWER SUPPLY SYSTEM WITH AUTOMATIC TRANSFER FUNCTION AND METHOD OF CONTROLLING THE SAME

(75) Inventors: Hung-Chieh Lin, Taoyuan County (TW); Chien-Chih Chan, Taoyuan County (TW); Hau-Ju Chu, Taoyuan County (TW); Hsin-Chan Yang, Taoyuan County (TW); Kun-Liang Shih, Taoyuan County (TW)

(73) Assignee: Delta Electronics, Inc., Taoyuan Couty (TW)

( * ) Notice: Subject to any disclaimer, the term of this patent is extended or adjusted under 35 U.S.C. 154(b) by 514 days.

(21) Appl. No.: 13/342,713

(22) Filed: Jan. 3, 2012

(65) Prior Publication Data

US 2013/0106190 A1  May 2, 2013

(30) Foreign Application Priority Data

Nov. 1, 2011 (TW) .............................. 100139742 A (51) Int. Cl.
*H02J 1/00* (2006.01)

(52) U.S. Cl.
USPC .......................................................... 307/70

(58) Field of Classification Search
USPC .......................................................... 307/70
See application file for complete search history.

(56) References Cited

U.S. PATENT DOCUMENTS 6,330,176 B1 * 12/2001 Thrap et al. ................... 363/142

* cited by examiner

*Primary Examiner* — Robert L. Deberadinis
(74) *Attorney, Agent, or Firm* — Muncy, Geissler, Olds & Lowe, P.C.

(57) ABSTRACT

A power supply system with an automatic transfer function includes a main-power-loop apparatus, a backup-power-loop apparatus, and a control unit. The main-power-loop apparatus has a first primary relay switch and a first SCR switch. The backup-power-loop apparatus has a second primary relay switch and a second SCR switch. The control unit turns on the first primary relay switch and the first SCR switch when a main power source can normally supply power, thus supplying power to a load via the main-power-loop apparatus by the main power source. The control unit turns on the second primary relay switch and the second SCR switch when the main power source cannot normally supply power, thus supplying power to the load via the backup-power-loop apparatus by a backup power source.

20 Claims, 6 Drawing Sheets

POWER SUPPLY SYSTEM WITH AUTOMATIC TRANSFER FUNCTION AND METHOD OF CONTROLLING THE SAME

BACKGROUND OF THE INVENTION

1. Field of the Invention

The present invention relates generally to a power supply system and a method of controlling the same, and more particularly to a power supply system with an automatic transfer function and a method of controlling the same.

2. Description of Prior Art

An automatic transfer switch (ATS) is an electric switch that reconnects electric power source from its main power source to a backup power source. A power-supplying operation is transferred from the main power source to the backup power source by the automatic transfer switch so that stable power can be continually supplied to the protected equipment when the main power source occurs abnormal operations, such as insufficient power, interruption of power supply, and so on.

Figure 1:
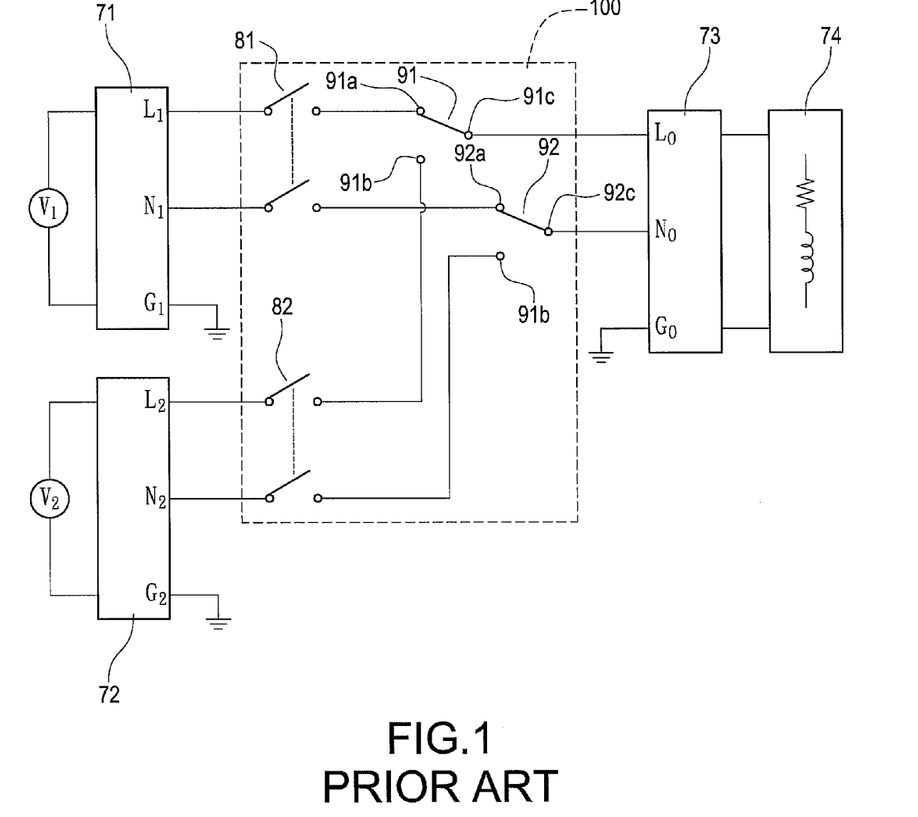
FIG. 1 is a schematic circuit diagram of a prior art power supply system with an automatic transfer function.

Reference is made to FIG. 1 which is a schematic circuit diagram of a prior art power supply system with an automatic transfer function. The power supply system is a dual power source power supply system. Note that, an automatic transfer switch apparatus 100 is adapted to transfer the two power sources to normally supply power to a load 74. That is, the power supply system includes a main power source V1, a backup power source V2, the automatic transfer switch apparatus 100, a main-power loop 71, a backup-power loop 72, and a load loop 73.

The automatic transfer switch apparatus 100 has a first switch 81, a second switch 82, a third switch 91, and a fourth switch 92. The first switch 81 is electrically connected to the main-power loop 71 and the second switch 82 is electrically connected to the backup-power loop 72. The third switch 91 has a first contact 91a, a second contact 91b, and a common contact 91c and the fourth switch 92 has a first contact 92a, a second contact 92b, and a common contact 92c.

The first switch 81 is turned on, the common contact 91c of the third switch 91 is connected to the first contact 91a, and the common contact 91c of the fourth switch 92 is connected to the first contact 92a when the main power source V1 can normally supply power so that the main power source V1 supplies power to the load 74 via the main-power loop 71 and the load loop 73. On the other hand, the first switch 81 is turned off, the second switch 82 is turned on, the common contact 91c of the third switch 91 is connected to the second contact 91b, and the common contact 92c of the fourth switch 92 is connected to the second contact 92b when the main power source V1 cannot normally supply power so that the backup power source V2 supplies power to the load 74 via the backup-power loop 72 and the load loop 73. Therefore, a power-supplying operation is transferred from the main power source V1 to the backup power source V2 by the automatic transfer switch apparatus 100 so that stable power can be continually supplied to the protected equipment when the main power source V1 occurs abnormal operations, such as insufficient power, interruption of power supply, and so on.

For transmission and distribution operations of the power system, however, uncontrolled electric arc possibly carries some damage to rear-end electronic equipment in the transmission and distribution system. For example, uncontrolled electric arc, which is produced from by breaking or connecting switches, would melt switch contacts in distribution circuits so that the malfunctioned switches, the faulty electronic equipment, or even casualties could occur because of the switching failure between the main power source and the backup power source.

Accordingly, it is desirable to provide a power supply system with an automatic transfer function and a method of controlling the same are disclosed. Because the silicon-controlled rectifier (SCR) has the ability to bear large transient current but the mechanical relay has the limitation of mechanical lifetime, the SCRs are adapted to replace the mechanical relays to increase the reliability and coordination of transferring power supply between the main power source and the backup power source.

SUMMARY OF THE INVENTION

An object of the invention is to provide a power supply system with an automatic transfer function to solve the above-mentioned problems.

The power supply system with an automatic transfer function is adapted to uninterruptibly supply power to a load. The power supply system includes main-power-loop apparatus, a backup-power-loop apparatus, and a control unit.

The main-power-loop apparatus is electrically connected to a main power source. The main-power-loop apparatus has a first primary relay switch and a first SCR switch. The first SCR switch is electrically connected to the first primary relay switch and the load.

The backup-power-loop apparatus is electrically connected to a backup power source and electrically connected in parallel to the main-power-loop apparatus. The backup-power-loop apparatus has a second primary relay switch and a second SCR switch. The second SCR switch is electrically connected to the second primary relay switch and the load.

The control unit produces a plurality of driven signals to control the first primary relay switch, the first SCR switch, the second primary relay switch, and the second SCR switch.

Another object of the invention is to provide a method of controlling a power supply system with an automatic transfer function to solve the above-mentioned problems.

The method of controlling the power supply system with an automatic transfer function includes following steps: (a) a main-power-loop apparatus is provided; wherein the main-power-loop apparatus has a first primary relay switch and a first SCR switch electrically connected in series to the first primary relay switch; the main-power-loop apparatus is electrically connected to a main power source and a load via a main-power loop and a load loop, respectively. (b) a backup-power-loop apparatus, which is electrically connected in parallel to the main-power-loop apparatus, is provided; wherein the backup-power-loop apparatus has a second primary relay switch and a second SCR switch electrically connected in series to the second primary relay switch; the backup-power-loop apparatus is electrically connected to a backup power source and the load via a backup-power loop and the load loop, respectively. (c) a control unit is provided; wherein the control unit produces a plurality of driven signals to control the first primary relay switch, the first SCR switch, the second primary relay switch, and the second SCR switch. (d) the first primary relay switch and the first SCR switch are turned on by the control unit so that the main power source supplies power to the load via the main-power-loop apparatus when the main power source can normally supply power. (e) the second primary relay switch and the second SCR switch are turned on by the control unit so that the backup power source supplies power to the load via the backup-power-loop apparatus when the main power source cannot normally supply power.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 2:
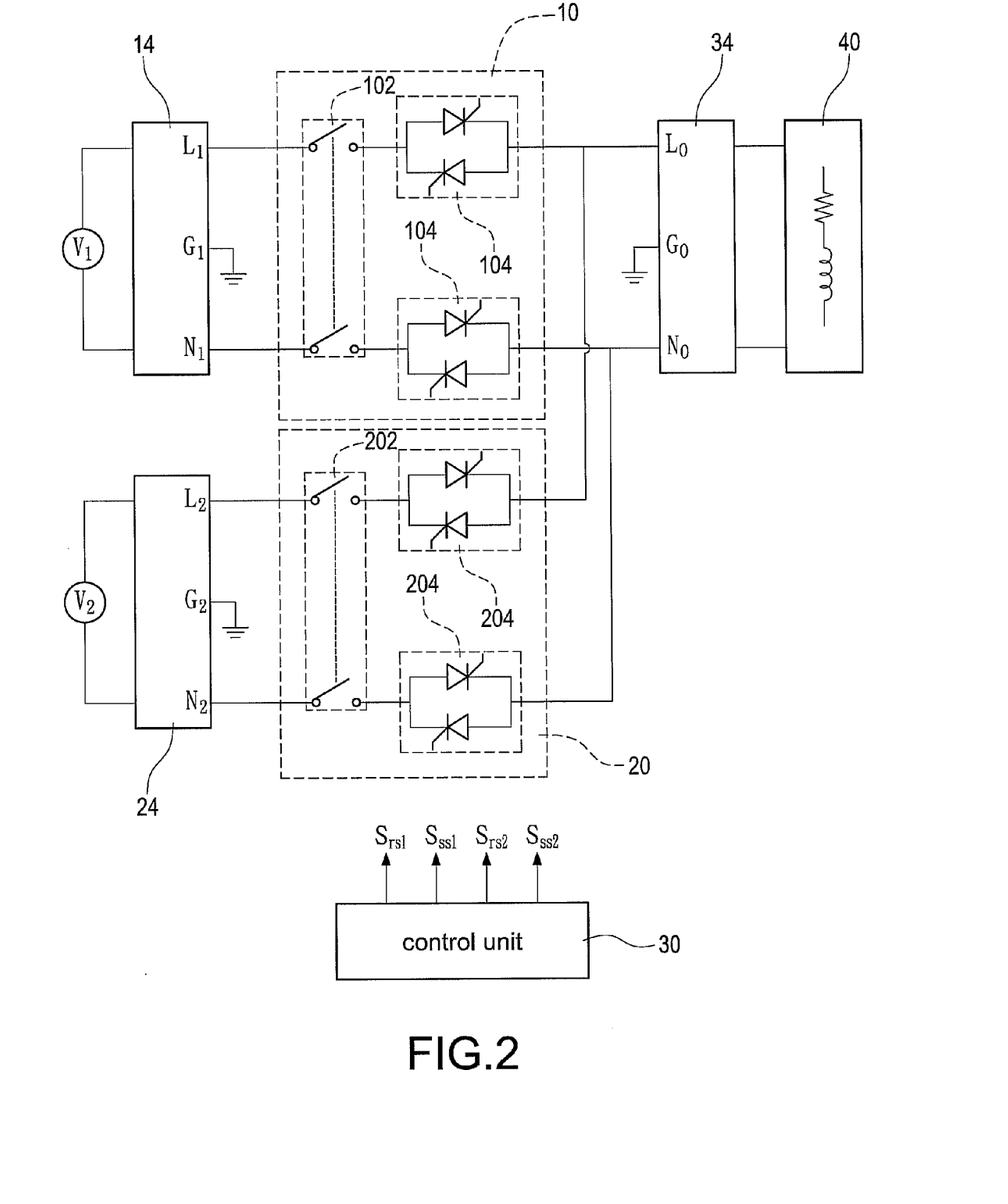
FIG. 2 is a schematic circuit diagram of a power supply system with an automatic transfer function according to a first embodiment of the present invention.

Reference is made to FIG. 2 which is a schematic circuit diagram of a power supply system with an automatic transfer function according to a first embodiment of the present invention. The power supply system provides a main-power loop 14, a backup-power loop 24, and a load loop 34. The main-power loop 14, the backup-power loop 24, and the load loop 34 are electrically connected to a main power source V1, a backup power source V2, and a load 40, respectively. The power supply system with an automatic transfer function includes a main-power-loop apparatus 10, a backup-power-loop apparatus 20, and a control unit 30. In particular, the main power source V1 is an AC utility or a generator; the backup power source V2 is an uninterrupted power apparatus, but not limited.

The main-power-loop apparatus 10 is electrically connected to the main power source V1 by the main-power loop 14. The main-power-loop apparatus 10 has a first primary relay switch 102 and a first silicon-controlled rectifier switch 104 (referred to as a "SCR switch" hereinafter). The first primary relay switch 102 is electrically connected in series to the main-power loop 14. The first SCR switch 104 is electrically connected in series to the first relay switch 102 and the load loop 34. The backup-power-loop apparatus 20 is electrically connected to the backup power source V2 via the backup-power loop 24 and electrically connected in parallel to the main-power-loop apparatus 10. The backup-power-loop apparatus 20 has a second primary relay switch 202 and a second SCR switch 204. The second primary relay switch 202 is electrically connected in series to the backup-power loop 24. The second SCR switch 204 is electrically connected in series to the second primary relay switch 202 and the load loop 34.

The control unit 30 is electrically connected to the main-power-loop apparatus 10 and the backup-power-loop apparatus 20 and produces a plurality of driven signals Srs1,Sss1, Srs2,Sss2 to control the first relay switch 102, the first SCR switch 104, the second primary relay switch 202, and the second SCR switch 204, respectively, as described in more detail below.

Note that, the control unit 30 turns on the first primary relay switch 102 and the first SCR switch 104 so that the main power source V1 supplies power to the load 40 via the main-power-loop apparatus 10 when the main power source V1 can normally supply power. The control unit 30 turns on the second primary relay switch 202 and the second SCR switch 204 so that the backup power source V2 supplies power to the load 40 via the backup-power-loop apparatus 20 when the main power source V1 cannot normally supply power.

Comparing to the prior art, in the first embodiment, the first SCR switch 104 and the second SCR switch 204 are used to replace relay switches. Because the SCR switch has the ability to bear large transient current but the mechanical relay has the limitation of mechanical lifetime, the SCR switches are adapted to replace the mechanical relay switches to increase the reliability and coordination of transferring power supply between the main power source and the backup power source. Accordingly, the switching failure between the main power source V1 and the backup power source V2 can be avoided because of the uncontrolled electric arc.

Furthermore, the coordination of transferring power supply between the main power source V1 and the backup power source V2 is also important. The second primary relay switch 202 needs to be completely turned on when the main power source V1 cannot normally supply power and the backup power source V2 is transferred. That is, the first primary relay switch 102 is turned off when the backup power source V2 has been introduced. In addition, the second SCR switch 204 is turned on when the backup power source V2 has been introduced and the first primary relay switch 102 has been turned off. Accordingly, a "break before make" switching control is achieved to implement an uninterrupted switching operation between different input sources. On the other hand, the first primary relay switch 102 needs to be completely turned on when the backup power source V2 supplies power and the main power source V1 can recover normally supply power, namely, the main power source V1 can be transferred to supply power. That is, the second primary relay switch 202 is turned off when the main power source V1 has been introduced. In addition, the first SCR switch 104 is turned on when the main power source V1 has been introduced and the second primary relay switch 202 has been turned off. Accordingly, a "break before make" switching control is achieved to implement an uninterrupted switching operation between different input sources. The above-mentioned coordination operation will be described in detail thereinafter. Accordingly, the first SCR switch 104 and the second SCR switch 204 are provided to overcome the switching failure between the main power source V1 and the backup power source V2 because of the ability of bearing large transient current thereof. Also, the first primary relay switch 102 and the second primary relay switch 202 play important roles of coordination of transferring power supply between the main power source V1 and the backup power source V2.

Figure 3:
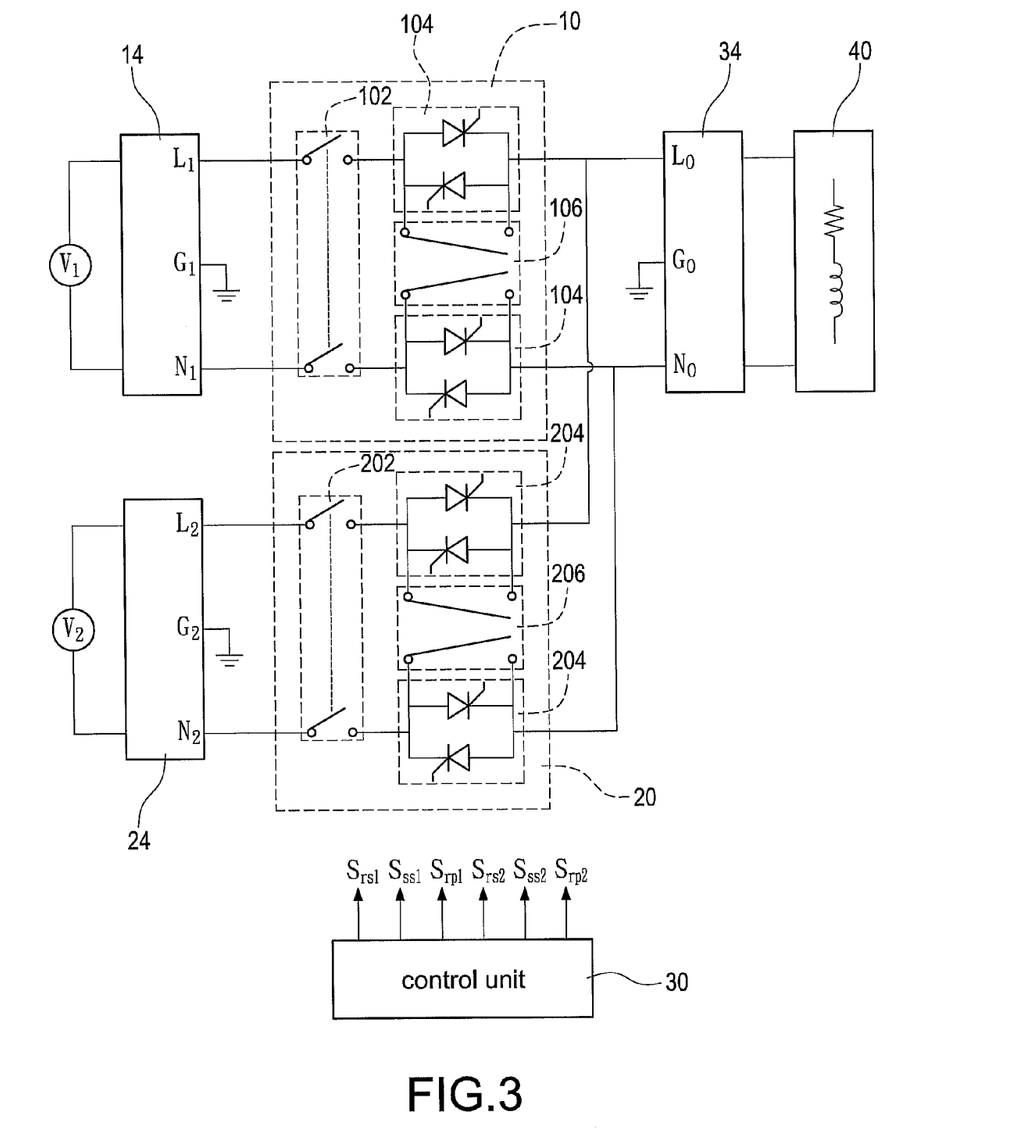
FIG. 3 is a schematic circuit diagram of a power supply system with an automatic transfer function according to a second embodiment of the present invention.

Reference is made to FIG. 3 which is a schematic circuit diagram of a power supply system with an automatic transfer function according to a second embodiment of the present invention. The difference between the second embodiment and the first embodiment is that: in the second embodiment, the main-power-loop apparatus 10 further has a first auxiliary relay switch 106 which is electrically connected in parallel to the first SCR switch 104; the backup-power-loop apparatus 20 further has a second auxiliary relay switch 206 which is electrically connected in parallel to the second SCR switch 204. In other words, the power supply system provides the main-power loop 14, the backup-power loop 24, and the load loop 34; the main-power loop 14, the backup-power loop 24, and the load loop 34 are electrically connected to a main power source V1, a backup power source V2, and a load 40, respectively. Also, the power supply system includes the main-power-loop apparatus 10, the backup-power-loop apparatus 20, and the control unit 30.

The main-power-loop apparatus 10 is electrically connected to the main power source V1 by the main-power loop 14. The main-power-loop apparatus 10 has the first primary relay switch 102, the first SCR switch 104, and the first auxiliary relay switch 106. The first primary relay switch 102 is electrically connected in series to the main-power loop 14. The first SCR switch 104 is electrically connected in series to the first relay switch 102 and the load loop 34. The backup-power-loop apparatus 20 is electrically connected to the backup power source V2 via the backup-power loop 24 and electrically connected in parallel to the main-power-loop apparatus 10. The backup-power-loop apparatus 20 has the second primary relay switch 202, the second SCR switch 204, and the second auxiliary relay switch 206. The second primary relay switch 202 is electrically connected in series to the backup-power loop 24. The second SCR switch 204 is electrically connected in series to the second primary relay switch 202 and the load loop 34. The control unit 30 is electrically connected to the main-power-loop apparatus 10 and the backup-power-loop apparatus 20 and produces a plurality of driven signals Srs1,Sss1,Srp1,Srs2,Sss2,Srp2 to control the first relay switch 102, the first SCR switch 104, the first auxiliary relay switch 106, the second primary relay switch 202, the second SCR switch 204, and the second auxiliary relay switch 206, respectively, as described in more detail below.

Note that, the control unit 30 turns on the first primary relay switch 102 and the first SCR switch 104 so that the main power source V1 supplies power to the load 40 via the main-power-loop apparatus 10 when the main power source V1 can normally supply power. The control unit 30 turns on the second primary relay switch 202 and the second SCR switch 204 so that the backup power source V2 supplies power to the load 40 via the backup-power-loop apparatus 20 when the main power source V1 cannot normally supply power.

Especially to deserve to be mentioned, reduction of conduction losses of the first SCR switch 104 and the second SCR switch 204 to increase efficiency of transferring power supply between the main power source V1 and the backup power source V2 is another important task. When the main power source V1 normally supplies power, the main power source V1 is introduced by turning on the first primary relay switch 102 and then the first SCR switch 104 is turned on. Afterward, the first auxiliary relay switch 106 is turned on to provide a bypass path (by passing the first SCR switch 104) so that the main power source V1 can supply power to the load 40 via the first primary relay switch 102, the first auxiliary relay switch 106, and the load loop 34. Hence, the first auxiliary relay switch 106, which is electrically connected in parallel to the first SCR switch 104, is turned on to provide a bypass path to significantly reduce conduction losses of the first SCR switch 104. Similarly, when the backup power source V2 normally supplies power, the backup power source V2 is introduced by turning on the second primary relay switch 202 and then the second SCR switch 204 is turned on. Afterward, the second auxiliary relay switch 206 is turned on to provide a bypass path (by passing the second SCR switch 204) so that the backup power source V2 can supply power to the load 40 via the second primary relay switch 202, the second auxiliary relay switch 206, and the load loop 34. Hence, the second auxiliary relay switch 206, which is electrically connected in parallel to the second SCR switch 204, is turned on to provide a bypass path to significantly reduce conduction losses of the second SCR switch 204.

Figure 4:
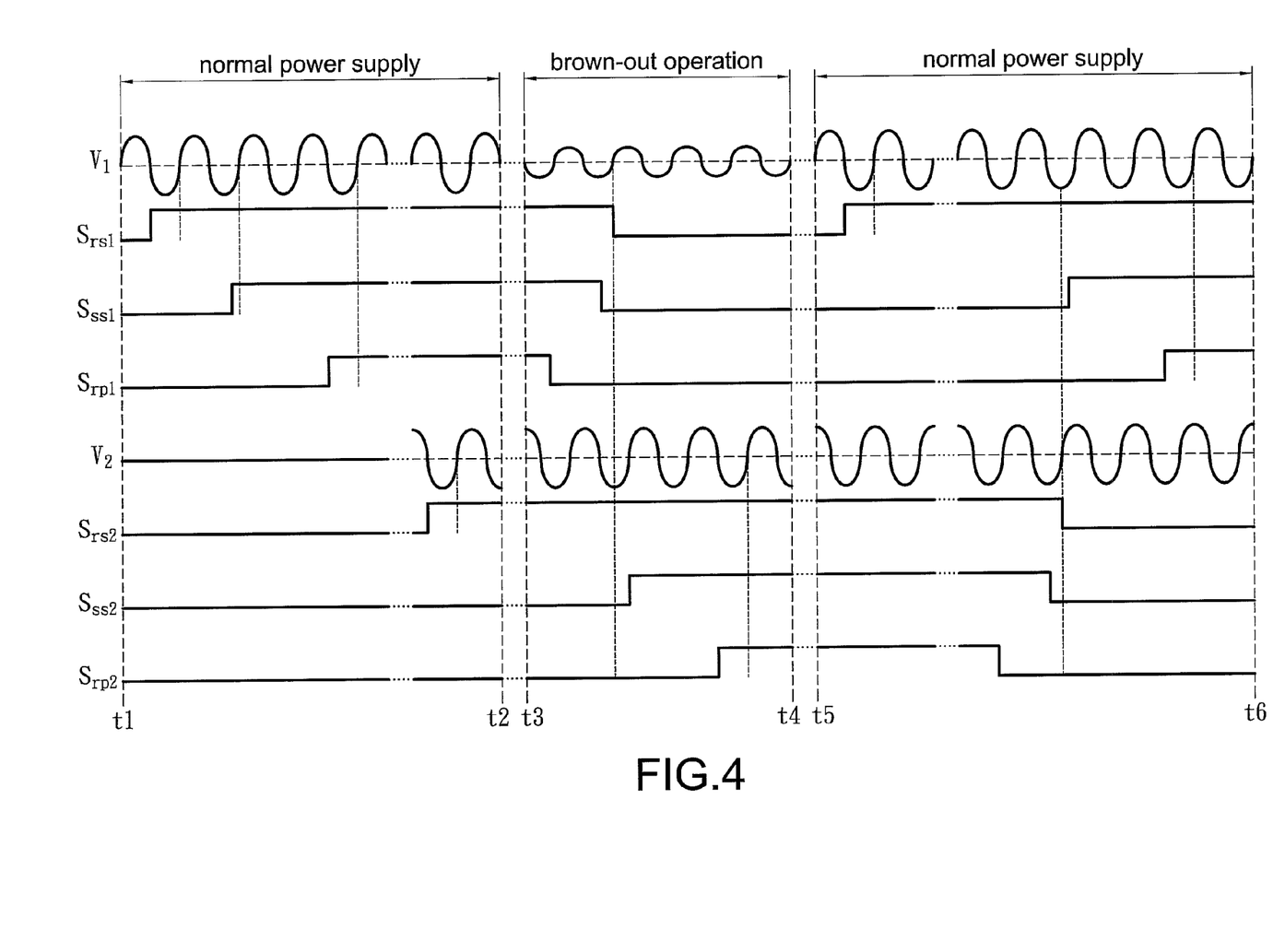
FIG. 4 is a timing diagram of the power supply system with an automatic transfer function operating under a brown-out condition according to the present invention.

Thereinafter, two abnormal power supply operations are exemplified for further demonstration. Reference is made to FIG. 4 which is a timing diagram of the power supply system with an automatic transfer function operating under a brown-out condition according to the present invention. The process of the brown-out operation is separated into three parts: (t1~t2) and (t5~t6) are normal power supply operations of the power supply system, (t3~t4) is the brown-out operation.

During t1~t2, the main power source V1 can normally supply power. Also, the control unit 30 (shown in FIG. 3) sequentially produces a high-level first primary relay switch driven signal Srs1, a high-level first SCR switch driven signal Sss1, and a high-level first auxiliary relay switch driven signal Srp1. Accordingly, the first primary relay switch 102, the first SCR switch 104, and the first auxiliary relay switch 106 are sequentially turned on so that the main power source V1 supplies power to the load 40 via the main-power-loop apparatus 10. In addition, the control unit 30 further produces a high-level second primary relay switch driven signal Srs2 to turn on the second primary relay switch 202 so that the backup power source V2 is introduced to be standby after the main power source V1 completely supplies power to the load 40.

During t3~t4, the main power source V1 cannot normally supply power because the brown-out condition occurs. The control unit 30 sequentially produces a low-level first auxiliary relay switch driven signal Srp1, a low-level first SCR switch driven signal Sss1, and a low-level first primary relay switch driven signal Srs1. Accordingly, the first auxiliary relay switch 106, the first SCR switch 104, and first primary relay switch 102 are sequentially turned off so that the main power source V1 stops supplying power to the load 40. In addition, the control unit 30 sequentially produces a high-level second SCR switch driven signal Sss2 and a high-level second auxiliary relay switch Srp2 to sequentially turn on the second SCR switch 204 and the second auxiliary relay switch 206, respectively, so that the backup power source V2 is transferred to supply power to the load 40 via the backup-power-loop apparatus 20 after the first primary relay switch 102 is completely turned off. Accordingly, a power-supplying operation is transferred from the main power source V1 to the backup power source V2.

During t5~t6, the control unit 30 produces a high-level first primary relay switch driven signal Srs1 to turn on the first primary relay switch 102 so that the main power source V1 is introduced to be standby when the main power source V1 can recover normally supply power. Afterward, the control unit 30 sequentially produces a low-level second auxiliary relay switch driven signal Srp2, a low-level second SCR switch driven signal Sss2, and a low-level second primary relay switch driven signal Srs2. Accordingly, the second auxiliary relay switch 206, the second SCR switch 204, and the second primary relay switch 202 are sequentially turned off so that the backup power source V2 stops supplying power to the load 40. In addition, the control unit 30 sequentially produces a high-level first SCR switch driven signal Sss1 and a high-level first auxiliary relay switch driven signal Srp1 to sequentially turn on the first SCR switch 104 and the first auxiliary relay switch 106, respectively, so that the main power source V1 is transferred to supply power to the load 40 via the main-power-loop apparatus 10 after the second primary relay switch 202 is completely turned off. Accordingly, a power-supplying operation is transferred from the backup power source V2 to the main power source V1.

Especially to deserve to be mentioned, a coordination of transferring power supply between the main power source V1 and the backup power source V2 is achieved by a "break before make" switching control of controlling on/off timing of the driven signals by the control unit 30. Also, the first SCR switch 104 and the first auxiliary relay switch 106 (or the second SCR switch 204 and the second auxiliary relay switch 206) are controlled to provide a bypass path via the first auxiliary relay switch 106 (or the second auxiliary relay switch 206), thus significantly reducing conduction losses of the first SCR switch 104 (or the second SCR switch 204).

Figure 5:
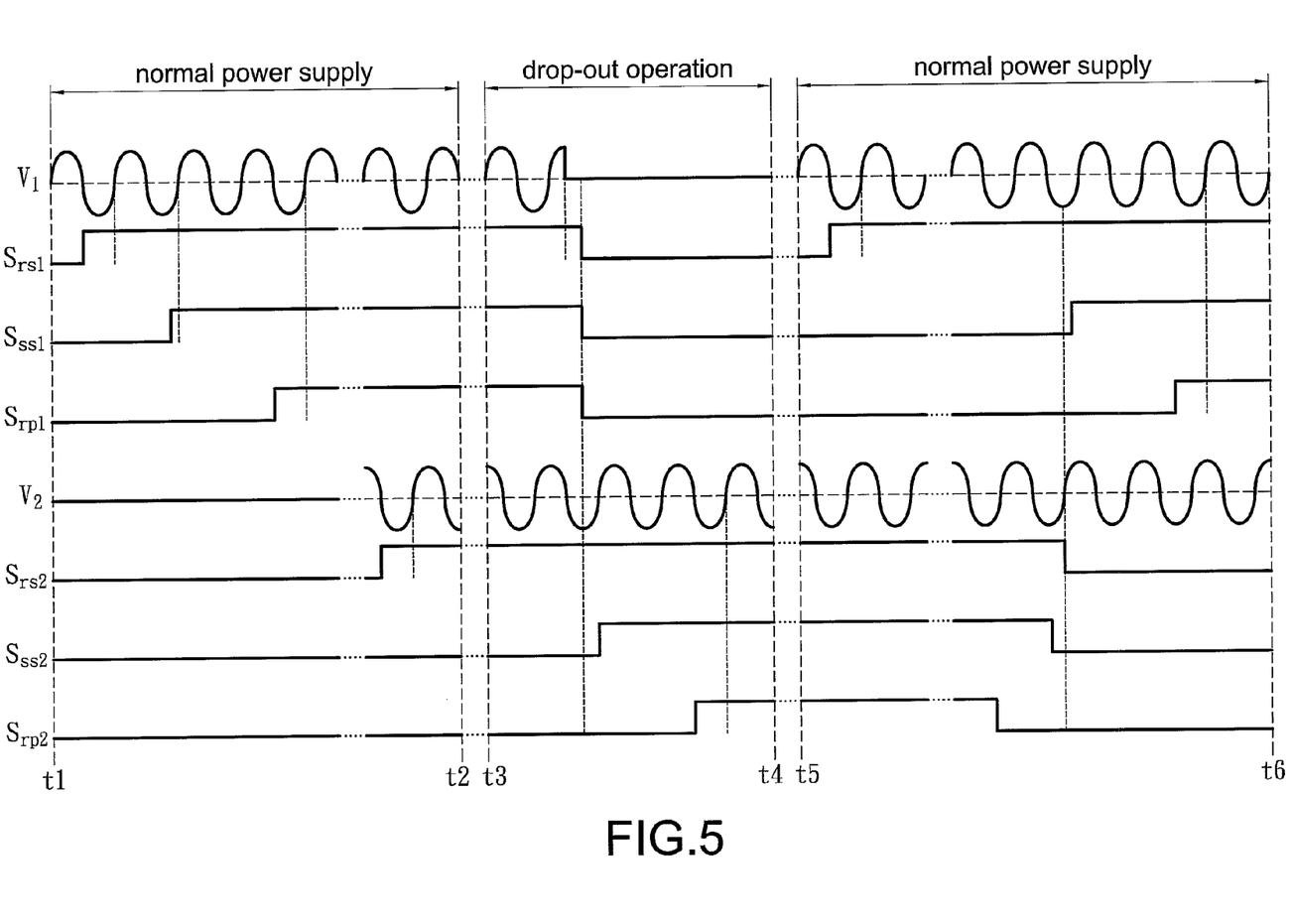
FIG. 5 is a timing diagram of the power supply system with an automatic transfer function operating under a drop-out condition according to the present invention.

Reference is made to FIG. 5 which is a timing diagram of the power supply system with an automatic transfer function operating under a drop-out condition according to the present invention. The process of the drop-out operation is separated into three parts: (t1~t2) and (t5~t6) are normal power supply operations of the power supply system, (t3~t4) is the drop-out operation.

During t1~t2, the main power source V1 can normally supply power. Also, the control unit 30 (shown in FIG. 3) sequentially produces a high-level first primary relay switch driven signal Srs1, a high-level first SCR switch driven signal Sss1, and a high-level first auxiliary relay switch driven signal Srp1. Accordingly, the first primary relay switch 102, the first SCR switch 104, and the first auxiliary relay switch 106 are sequentially turned on so that the main power source V1 supplies power to the load 40 via the main-power-loop apparatus 10. In addition, the control unit 30 further produces a high-level second primary relay switch driven signal Srs2 to turn on the second primary relay switch 202 so that the backup power source V2 is introduced to be standby after the main power source V1 completely supplies power to the load 40.

During t3~t4, the main power source V1 cannot normally supply power because the drop-out condition occurs. The control unit 30 sequentially produces a low-level first auxiliary relay switch driven signal Srp1, a low-level first SCR switch driven signal Sss1, and a low-level first primary relay switch driven signal Srs1. Accordingly, the first auxiliary relay switch 106, the first SCR switch 104, and first primary relay switch 102 are simultaneously turned off so that the main power source V1 stops supplying power to the load 40. In addition, the control unit 30 sequentially produces a high-level second SCR switch driven signal Sss2 and a high-level second auxiliary relay switch Srp2 to sequentially turn on the second SCR switch 204 and the second auxiliary relay switch 206, respectively, so that the backup power source V2 is transferred to supply power to the load 40 via the backup-power-loop apparatus 20 after the first primary relay switch 102 is completely turned off. Accordingly, a power-supplying operation is transferred from the main power source V1 to the backup power source V2.

During t5~t6, the control unit 30 produces a high-level first primary relay switch driven signal Srs1 to turn on the first primary relay switch 102 so that the main power source V1 is introduced to be standby when the main power source V1 can recover normally supply power. Afterward, the control unit 30 sequentially produces a low-level second auxiliary relay switch driven signal Srp2, a low-level second SCR switch driven signal Sss2, and a low-level second primary relay switch driven signal Srs2. Accordingly, the second auxiliary relay switch 206, the second SCR switch 204, and the second primary relay switch 202 are sequentially turned off so that the backup power source V2 stops supplying power to the load 40. In addition, the control unit 30 sequentially produces a high-level first SCR switch driven signal Sss1 and a high-level first auxiliary relay switch driven signal Srp1 to sequentially turn on the first SCR switch 104 and the first auxiliary relay switch 106, respectively, so that the main power source V1 is transferred to supply power to the load 40 via the main-power-loop apparatus 10 after the second primary relay switch 202 is completely turned off. Accordingly, a power-supplying operation is transferred from the backup power source V2 to the main power source V1.

Especially to deserve to be mentioned, a coordination of transferring power supply between the main power source V1 and the backup power source V2 is achieved by a "break before make" switching control of controlling on/off timing of the driven signals by the control unit 30. Also, the first SCR switch 104 and the first auxiliary relay switch 106 (or the second SCR switch 204 and the second auxiliary relay switch 206) are controlled to provide a bypass path via the first auxiliary relay switch 106 (or the second auxiliary relay switch 206), thus significantly reducing conduction losses of the first SCR switch 104 (or the second SCR switch 204).

Figure 6:
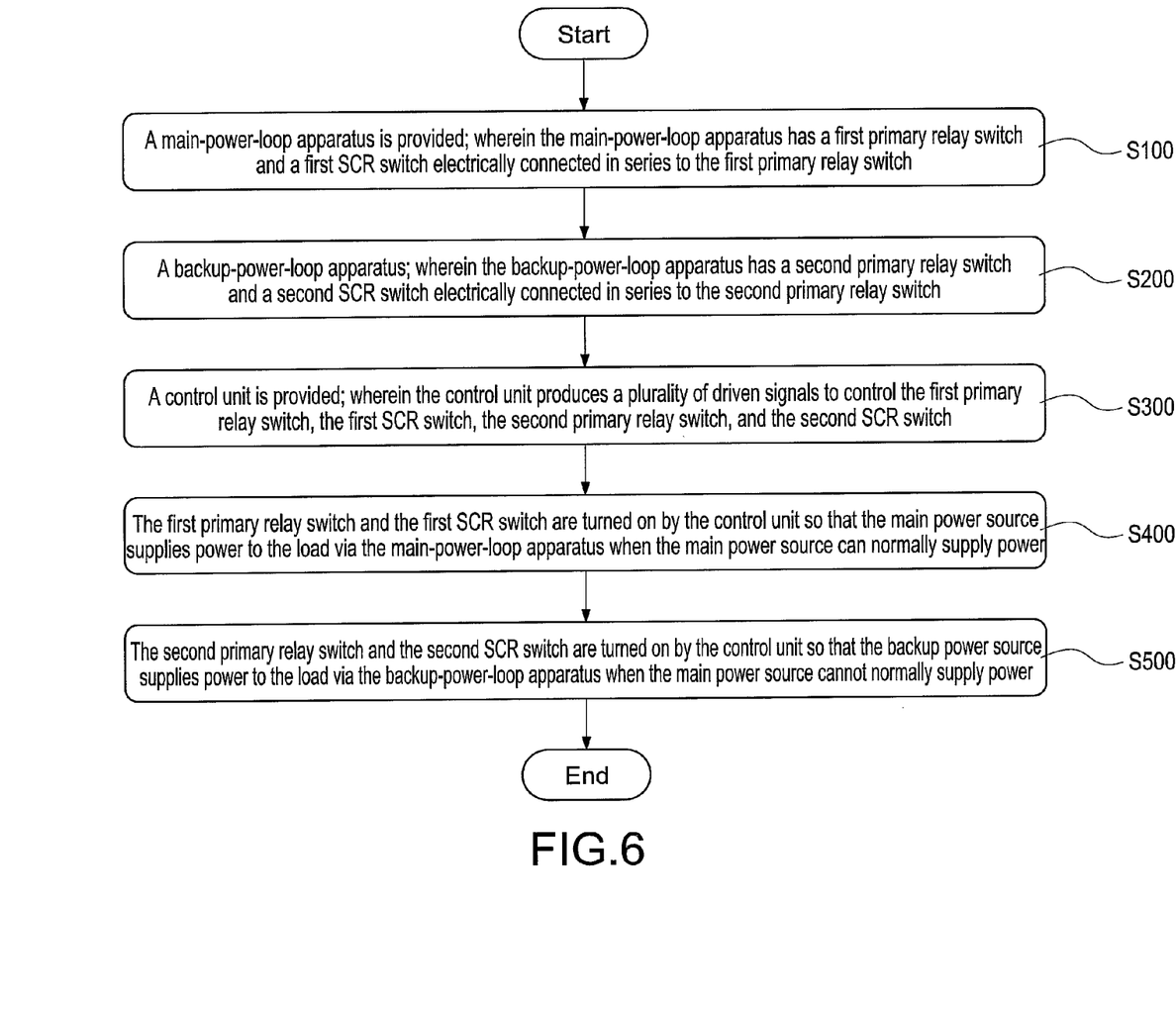
FIG. 6 is a flowchart of a method of controlling a power supply system with an automatic transfer function.

Reference is made to FIG. 6 which is a flowchart of a method of controlling a power supply system with an automatic transfer function. The power supply system provides a main-power loop, a backup-power loop, and a load loop. The main-power loop, the backup-power loop, and the load loop are electrically connected to a main power source, a backup power source, and a load, respectively. The method of controlling the power supply system with an automatic transfer function includes following steps: A main-power-loop apparatus is provided; wherein the main-power-loop apparatus has a first primary relay switch and a first SCR switch electrically connected in series to the first primary relay switch (S100). The main-power-loop apparatus is electrically connected to a main power source and a load via a main-power loop and a load loop, respectively. In addition, the main-power-loop apparatus further includes a first auxiliary relay switch which is electrically connected in parallel to the first SCR switch to provide a bypass path and reduce conduction losses of the first SCR switch. A backup-power-loop apparatus, which is electrically connected in parallel to the main-power-loop apparatus, is provided; wherein the backup-power-loop apparatus has a second primary relay switch and a second SCR switch electrically connected in series to the second primary relay switch (S200). The backup-power-loop apparatus is electrically connected to a backup power source and the load via a backup-power loop and the load loop, respectively. In addition, the backup-power-loop apparatus further includes a second auxiliary relay switch which is electrically connected in parallel to the second SCR switch to provide a bypass path and reduce conduction losses of the second SCR switch. A control unit is provided; wherein the control unit produces a plurality of driven signals to control the first primary relay switch, the first SCR switch, the second primary relay switch, and the second SCR switch (S300). The first primary relay switch and the first SCR switch are turned on by the control unit so that the main power source supplies power to the load via the main-power-loop apparatus when the main power source can normally supply power (S400).

In a practical embodiment, the control unit sequentially produces a high-level first primary relay switch driven signal and a high-level first SCR switch driven signal to sequentially turn on the first primary relay switch and the first SCR switch, respectively, so that the main power source supplies power to the load via the main-power-loop apparatus when the main power source can normally supply power. The control unit further produces a high-level second primary relay switch driven signal to turn on the second primary relay switch so that the backup power source is introduced to be standby when the main power source completely supplies power.

In another practical embodiment, the control unit sequentially produces a high-level first primary relay switch driven signal, a high-level first SCR switch driven signal, and a high-level first auxiliary relay switch driven signal to sequentially turn on the first primary relay switch, the first SCR switch, and the first auxiliary relay switch, respectively, so that the main power source supplies power to the load via the main-power-loop apparatus when the main power source can normally supply power. The control unit further produces a high-level second primary relay switch driven signal to turn on the second primary relay switch so that the backup power source is introduced to be standby when the main power source completely supplies power.

The second primary relay switch and the second SCR switch are turned on by the control unit so that the backup power source supplies power to the load via the backup-power-loop apparatus when the main power source cannot normally supply power (S500). In a practical embodiment, the control unit sequentially produces a low-level first SCR switch driven signal and a low-level first primary relay switch driven signal to sequentially turn off the first SCR switch and the first primary relay switch, respectively, so that the main power source stops supplying power to the load when the main power source cannot normally supply power. The control unit produces a high-level second SCR switch driven signal to turn on the second SCR switch so that the backup power source is transferred to supply power to the load via the backup-power-loop apparatus after the first primary relay switch is completely turned off.

In another practical embodiment, the control unit sequentially produces a low-level first auxiliary relay switch driven signal, a low-level first SCR switch driven signal, and a low-level first primary relay switch driven signal to sequentially turn off the first auxiliary relay switch, the first SCR switch, and the first primary relay switch, respectively, so that the main power source stops supplying power to the load when the main power source cannot normally supply power. The control unit produces a high-level second SCR switch driven signal and a high-level second auxiliary relay switch driven signal to turn on the second SCR switch and the second auxiliary relay switch, respectively, so that the backup power source is transferred to supply power to the load via the backup-power-loop apparatus after the first primary relay switch is completely turned off.

In conclusion, the present invention has following advantages:

1. Because the SCR switch has the ability to bear large transient current but the mechanical relay has the limitation of mechanical lifetime, the SCR switches are adapted to replace the mechanical relay switches to increase the reliability and coordination of transferring power supply between the main power source and the backup power source. Accordingly, the switching failure between the main power source V1 and the backup power source V2 can be avoided because of the uncontrolled electric arc;

2. The first primary relay switch 102 and the second primary relay switch 202 play important roles of coordination of transferring power supply between the main power source V1 and the backup power source V2; and 3. The first auxiliary relay switch 106 (or the second auxiliary relay switch 108) is electrically connected to the first SCR switch (or the second SCR switch 204) to provide a bypass path so as to significantly reduce conduction losses of the first SCR switch 104 (or the second SCR switch 204) and increase efficiency of transferring power supply between the main power source V1 and the backup power source V2.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power supply system with an automatic transfer function, the power supply system adapted to uninterruptibly supply power to a load and comprising:
   a main-power-loop apparatus electrically connected to a main power source; the main-power-loop apparatus comprising:
   a first primary relay switch;
   a first SCR switch electrically connected to the first primary relay switch and the load;
   a backup-power-loop apparatus electrically connected to a backup power source and electrically connected in parallel to the main-power-loop apparatus; the backup-power-loop apparatus comprising:
   a second primary relay switch;
   a second SCR switch electrically connected to the second primary relay switch and the load; and
   a control unit producing a plurality of driven signals to control the first primary relay switch, the first SCR switch, the second primary relay switch, and the second SCR switch.

2. The power supply system with an automatic transfer function of claim 1, wherein the power supply system further comprises a main-power loop, a backup-power loop, and a load loop; the main-power-loop apparatus is electrically connected to the main power source via the main-power loop; the backup-power-loop apparatus is electrically connected to the backup power source via the backup-power loop; the main-power-loop apparatus and the backup-power-loop apparatus are electrically connected to the load by the load loop; the control unit turns on the first primary relay switch and the first SCR switch so that the main power source supplies power to the load via the main-power-loop apparatus when the main power source can normally supply power; the control unit turns on the second primary relay switch and the second SCR switch so that the backup power source supplies power to the load via the backup-power-loop apparatus when the main power source cannot normally supply power.

3. The power supply system with an automatic transfer function of claim 2, wherein the main-power-loop apparatus further comprises a first auxiliary relay switch; the first auxiliary relay switch is electrically connected to the first SCR switch to provide a bypass path and reduce conduction losses of the first SCR switch; the backup-power-loop apparatus further comprises a second auxiliary relay switch; the second auxiliary relay switch is electrically connected to the second SCR switch to provide a bypass path and reduce conduction losses of the second SCR switch.

4. The power supply system with an automatic transfer function of claim 3, wherein the control unit sequentially produces a high-level first primary relay switch driven signal, a high-level first SCR switch driven signal, and a high-level first auxiliary relay switch driven signal to sequentially turn on the first primary relay switch, the first SCR switch, and the first auxiliary relay switch, respectively, so that the main power source supplies power to the load via the main-power-loop apparatus when the main power source can normally supply power.

5. The power supply system with an automatic transfer function of claim 4, wherein the control unit further produces a high-level second primary relay switch driven signal to turn on the second primary relay switch so that the backup power source is introduced to be standby when the main power source completely supplies power.

6. The power supply system with an automatic transfer function of claim 3, wherein the control unit sequentially produces a low-level first auxiliary relay switch driven signal, a low-level first SCR switch driven signal, and a low-level first primary relay switch driven signal to sequentially turn off the first auxiliary relay switch, the first SCR switch, and the first primary relay switch, respectively, so that the main power source stops supplying power to the load when the main power source cannot normally supply power.

7. The power supply system with an automatic transfer function of claim 6, wherein the control unit produces a high-level second SCR switch driven signal and a high-level second auxiliary relay switch driven signal to turn on the second SCR switch and the second auxiliary relay switch, respectively, so that the backup power source is transferred to supply power to the load via the backup-power-loop apparatus after the first primary relay switch is completely turned off.

8. The power supply system with an automatic transfer function of claim 2, wherein the control unit sequentially produces a high-level first primary relay switch driven signal and a high-level first SCR switch driven signal to sequentially turn on the first primary relay switch and the first SCR switch, respectively, so that the main power source supplies power to the load via the main-power-loop apparatus when the main power source can normally supply power.

9. The power supply system with an automatic transfer function of claim 8, wherein the control unit further produces a high-level second primary relay switch driven signal to turn on the second primary relay switch so that the backup power source is introduced to be standby when the main power source completely supplies power.

10. The power supply system with an automatic transfer function of claim 2, wherein the control unit sequentially produces a low-level first SCR switch driven signal and a low-level first primary relay switch driven signal to sequentially turn off the first SCR switch and the first primary relay switch, respectively, so that the main power source stops supplying power to the load when the main power source cannot normally supply power.

11. The power supply system with an automatic transfer function of claim 10, wherein the control unit produces a high-level second SCR switch driven signal to turn on the second SCR switch so that the backup power source is transferred to supply power to the load via the backup-power-loop apparatus after the first primary relay switch is completely turned off.

12. The power supply system with an automatic transfer function of claim 1, wherein the main power source is an AC utility or a generator; the backup power source is an uninterrupted power apparatus.

13. A method of controlling a power supply system with an automatic transfer function, comprising following steps:

(a) providing a main-power-loop apparatus; wherein the main-power-loop apparatus has a first primary relay switch and a first SCR switch electrically connected in series to the first primary relay switch; the main-power-loop apparatus is electrically connected to a main power source and a load via a main-power loop and a load loop, respectively;

(b) providing a backup-power-loop apparatus electrically connected in parallel to the main-power-loop apparatus; wherein the backup-power-loop apparatus has a second primary relay switch and a second SCR switch electrically connected in series to the second primary relay switch; the backup-power-loop apparatus is electrically connected to a backup power source and the load via a backup-power loop and the load loop, respectively;

(c) providing a control unit; wherein the control unit produces a plurality of driven signals to control the first primary relay switch, the first SCR switch, the second primary relay switch, and the second SCR switch;

(d) turning on the first primary relay switch and the first SCR switch by the control unit so that the main power source supplies power to the load via the main-power-loop apparatus when the main power source can normally supply power; and (e) turning on the second primary relay switch and the second SCR switch by the control unit so that the backup power source supplies power to the load via the backup-power-loop apparatus when the main power source cannot normally supply power.

14. The method of controlling the power supply system of claim 13, in step (a), wherein the main-power-loop apparatus further comprises a first auxiliary relay switch which is electrically connected in parallel to the first SCR switch to provide a bypass path and reduce conduction losses of the first SCR switch.

15. The method of controlling the power supply system of claim 14, wherein the control unit sequentially produces a high-level first primary relay switch driven signal, a high-level first SCR switch driven signal, and a high-level first auxiliary relay switch driven signal to sequentially turn on the first primary relay switch, the first SCR switch, and the first auxiliary relay switch, respectively, so that the main power source supplies power to the load via the main-power-loop apparatus when the main power source can normally supply power; the control unit further produces a high-level second primary relay switch driven signal to turn on the second primary relay switch so that the backup power source is introduced to be standby when the main power source completely supplies power.

16. The method of controlling the power supply system of claim 14, wherein the control unit sequentially produces a low-level first auxiliary relay switch driven signal, a low-level first SCR switch driven signal, and a low-level first primary relay switch driven signal to sequentially turn off the first auxiliary relay switch, the first SCR switch, and the first primary relay switch, respectively, so that the main power source stops supplying power to the load when the main power source cannot normally supply power; the control unit produces a high-level second SCR switch driven signal and a high-level second auxiliary relay switch driven signal to turn on the second SCR switch and the second auxiliary relay switch, respectively, so that the backup power source is transferred to supply power to the load via the backup-power-loop apparatus after the first primary relay switch is completely turned off.

17. The method of controlling the power supply system of claim 13, in step (b), wherein the backup-power-loop apparatus further comprises a second auxiliary relay switch which is electrically connected in parallel to the second SCR switch to provide a bypass path and reduce conduction losses of the second SCR switch.

18. The method of controlling the power supply system of claim 13, wherein the control unit sequentially produces a high-level first primary relay switch driven signal and a high-level first SCR switch driven signal to sequentially turn on the first primary relay switch and the first SCR switch, respectively, so that the main power source supplies power to the load via the main-power-loop apparatus when the main power source can normally supply power; the control unit further produces a high-level second primary relay switch driven signal to turn on the second primary relay switch so that the backup power source is introduced to be standby when the main power source completely supplies power.

19. The method of controlling the power supply system of claim 13, wherein the control unit sequentially produces a low-level first SCR switch driven signal and a low-level first primary relay switch driven signal to sequentially turn off the first SCR switch and the first primary relay switch, respectively, so that the main power source stops supplying power to the load when the main power source cannot normally supply power; the control unit produces a high-level second SCR switch driven signal to turn on the second SCR switch so that the backup power source is transferred to supply power to the load via the backup-power-loop apparatus after the first primary relay switch is completely turned off.

20. The method of controlling the power supply system of claim 13, wherein the main power source is an AC utility or a generator; the backup power source is an uninterrupted power apparatus.

* * * * *

UNITED STATES PATENT AND TRADEMARK OFFICE
CERTIFICATE OF CORRECTION

PATENT NO. : 8,860,251 B2  
APPLICATION NO. : 13/342713  
DATED : October 14, 2014  
INVENTOR(S) : Hung-Chieh Lin et al.

Page 1 of 1

It is certified that error appears in the above-identified patent and that said Letters Patent is hereby corrected as shown below:

On the Title Page, item (73) Assignee, "DELTA ELECTRONICS, INC., Taoyuan Couty (TW)" should be changed to --DELTA ELECTRONICS, INC., Taoyuan County (TW)--.

Signed and Sealed this  
Fourteenth Day of April, 2015

Michelle K. Lee  
*Director of the United States Patent and Trademark Office*